Oct. 25, 1966  A. C. DURDIN ET AL  3,280,556
ENGINE STARTER
Original Filed Aug. 30, 1960
5 Sheets-Sheet 5
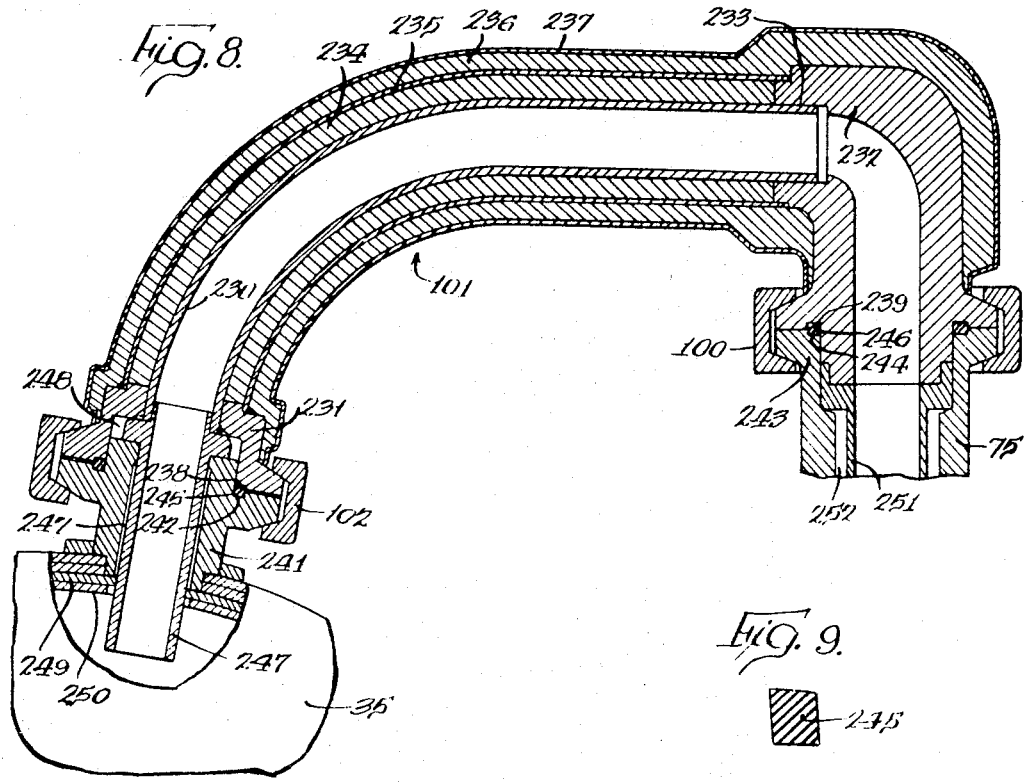

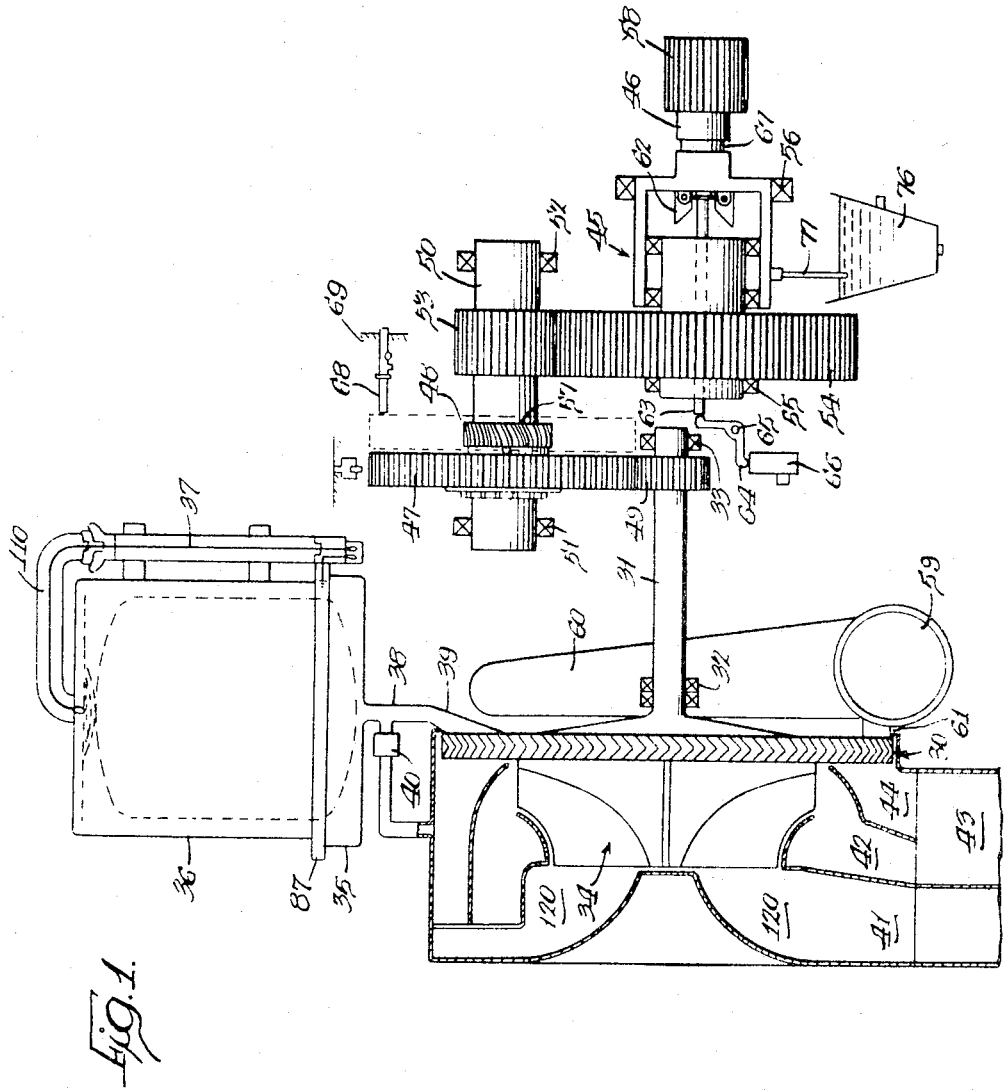

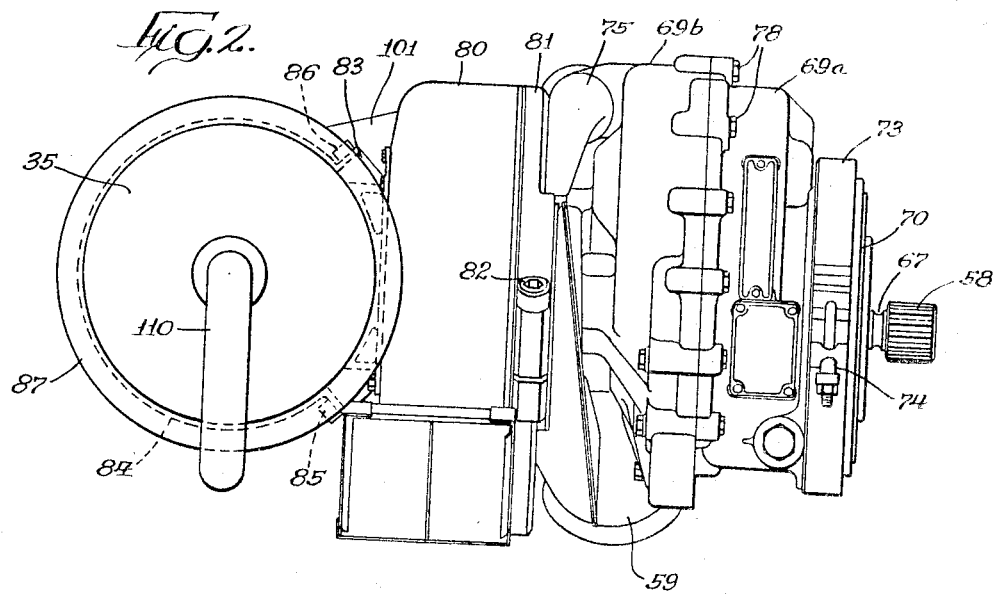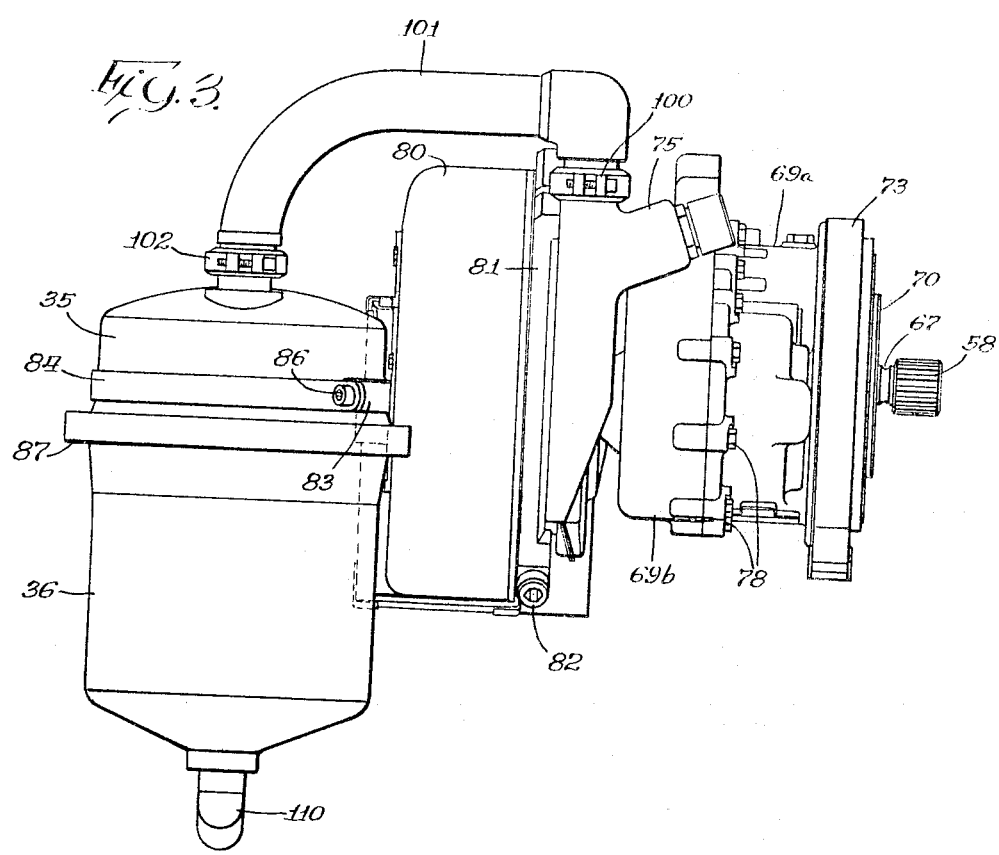

3,280,556
ENGINE STARTER

Augustus C. Durdin, Rockton, and Bernard W. Kittle and Stephen S. Baits, Rockford, Ill., and Donald F. Swenski, Arvada, Colo., assignors to Sundstrand Corporation, a corporation of Illinois
Original application Aug. 30, 1960, Ser. No. 52,845. Divided and this application Dec. 17, 1964, Ser. No. 422,062
13 Claims. (Cl. 60—39.47)

The present invention relates to engine starters and more particularly to turbojet aircraft engine starters and this application is a divisional application of copending Serial No. 52,845, filed August 30, 1960, now abandoned.

The increasing use of turbojet engines in commercial and military aircraft has produced the need for a lightweight turbojet engine starter which can also have a reasonably long life between overhauls. Most of the starter systems presently used on these engines require associated ground equipment. This is a handicap particularly for military aircraft where there is a definite need to operate from fields which may not have the necessary ground equipment available. In addition, the starters presently used are not easily removed or replaced on the aircraft.

It is therefore an object of the present invention to provide a new and improved engine starter particularly suited to turbojet engines.

Another object is to provide an engine starter for turbojet engines which may be quickly mounted on and removed from such engines.

An additional object of the present invention is to provide a pipe for containing and transporting the hot gases produced by the combustion of a solid propellant.

Another object of the present invention is to provide a novel pipe connector for such a hot gas pipe.

A still further object of the present invention is to provide a plurality of mountings for a fuel cartridge on the starter housing.

Additional objects will become apparent from the following description of the accompanying drawings in which there is illustrated a preferred embodiment of the invention.

In the drawings, FIG. 1 is a schematic drawing illustrating a starter embodying the principles of the present invention;

FIG. 2 is an external front view of the starter with the combustion chamber mounted on the end of the starter ducting housing;

FIG. 3 is an external top view of the starter, as shown in FIG. 2, with the combustion chamber mounted on the end of the ducting housing;

FIG. 8 is a cross sectional drawing of the hot gas pipe and the pipe connectors;

FIG. 9 is a cross section of the trapezoidal sealing ring in the pipe connection.

Figure 4:
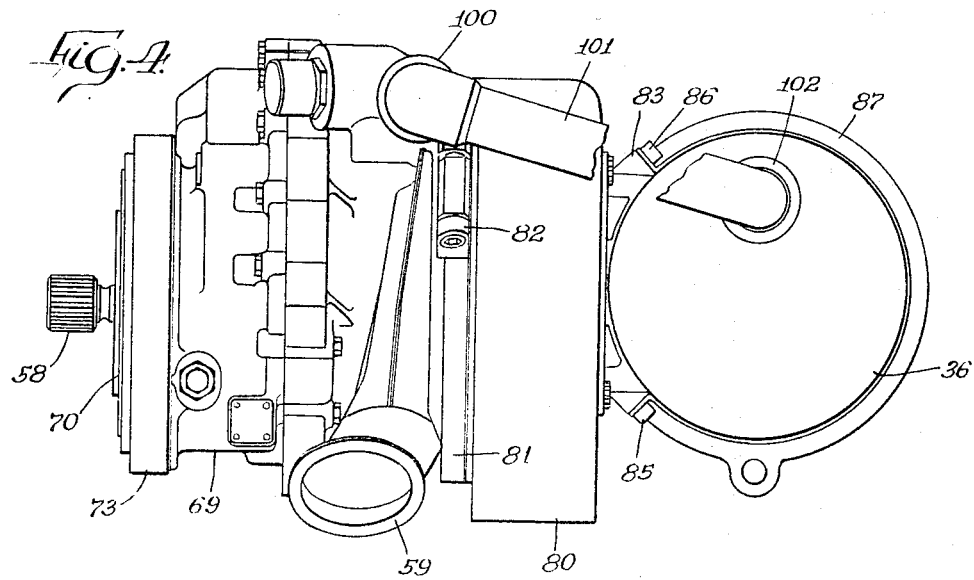
FIG. 4 is an external rear view of the starter with the combustion chamber mounted on the end of the ducting housing.

The relation of the operating elements of the present invention may be understood by reference to FIG. 1. A turbine wheel 30 with blades around its periphery is provided on a turbine shaft 31 to rotate therewith. Turbine shaft 31 is rotationally supported by bearings 32 and 33.

A fan 34 is mounted on one end of the shaft 31 adjoining turbine wheel 30. A combustion chamber composed of a base 35 and a cover 36 is provided to contain a charge of solid propellant. An electrical wiring system 37 provides a means for igniting the solid propellant. Gases produced by the combustion of the solid propellant pass down a manifold 38 and through a set of nozzles 39, which direct the flow of gases to rotate turbine wheel 30. A relief valve 40 normally limits the gas pressure in manifold 38 to $850 \pm 50$ lbs. p.s.i. The gas pressure produced by the combustion in a solid propellant cartridge (in chamber 35, 36) at $-65°$ F. is approximately 700 lbs. p.s.i. while the pressure produced in the cartridge at a temperature of $160°$ F. is between 1100 and 1200 lbs. p.s.i. By utilizing a pressure relief valve which limits the gas pressure to approximately 850 lbs. p.s.i. (which is only 150 lbs. greater than the gas pressure at $-65°$ F.) the nozzles can be designed for this range and an almost constant torque is provided at all temperatures between $160°$ F. and $-65°$ F. The common practice in similar turbine designs at the present time is to design the nozzles for temperatures of approximately $70°$ F. with the result that the torque drops off rapidly as the temperature decreases and increases excessively as the temperature increases.

Turbine shaft 31 has a gear 49 fixed thereon and meshing with a gear 47 on a helical spline 48. The latter is rigid on a shaft 50 rotatable in bearings 51 and 52 and having a gear 53 fixed thereon. Gear 53 meshes with a gear 54 driving a one-way clutch 45 including an output shaft 46 having a gear 58 thereon adapted for driving connection with a jet engine to be started. The assembly composed of gear 54 and clutch 45 is rotatable in bearings 55 and 56.

A safety means to prevent the turbine wheel 30 from reaching excessive speed is provided by one-way clutch 45. If the rotational velocity of the engine shaft connected with gear 58 exceeds the rotational velocity of the gear 54 the clutch prevents the starter from being driven by the engine.

If for any reason clutch 45 should fail to disengage when the engine speed exceeds that of the starter, a further safety means is provided by gear 47 mounted on helical spline gear 48. The helical spline of gear 48 is so orientated in supporting gear 47 that whenever gear 47 is driven by the turbine wheel 30 through shaft 31 and gear 49, the gear 47 tends to remain in mesh with the gear 49. However, whenever the engine speed exceeds that of the starter output shaft 46 to the extent that shaft 50 is driven at a greater rotational velocity (by the engine through gear 53, gear 54, a malfunction clutch 45 and shaft 46) than it is driven by the turbine wheel 30 through the gears 48, 47, 49 and shaft 31, the gear 47 will slide (to the right in FIG. 1) on gear 48, disengaging gear 49. In order to prevent gear 47 from disengaging gear 49 because of small engine surges, a shear pin 57 normally secures gear 47 to gear 48. Whenever the torque on shaft 50 produced by the engine exceeds the drag produced by the fan 34 by a predetermined value, pin 57 will shear allowing gear 47 to disengage from gear 49.

The combination of gear 49, gear 47, gear 48, shaft 50, gear 53 and gear 54 provides a reduction gear means which suitably reduces the output rotational velocity of the starter output shaft 46 and increases the torque provided by wheel 30 to start the engine.

The output shaft 46 has a "necked down" section 67 for the purpose of allowing it to shear if the torque produced at this point of the shaft reaches approximately 900 foot pounds. Thus the shear section provides a safety means to disengage the engine from the starter.

In order to indicate that shear pin 57 has sheared and that gear 47 is out of mesh with gear 49 a pin 68 is provided which will be forced to protrude from a starter housing 69 whenever such a condition exists.

Lubrication for the reduction gears and their supporting shafts is provided by an oil sump 76 and a set of oil slingers 77.

Referring to FIGS. 2 through 6, the starter housing 69, which directly or indirectly supports all elements of the starter, is constructed in two sections 69a and 69b and bolted together by a set of bolts 78. The housing 69 has joined to it a ducting housing 80 by means of a U-shaped (in cross section) clamp ring 81 secured by a bolt 82. FIG. 2, a front elevation of the starter, shows the spline gear 58 on the right-hand side. The shaft shear section 67 and the gear 58 extend beyond a mounting bracket 70. The mounting bracket 70 may be secured to the housing of an engine in such a manner that gear 58 will operably mesh with the engine shaft gearing. U-shaped clamping ring arcs 71 and 72 (FIG. 5), band 73 and bolt 74 are used to secure the starter housing 69 and mounting bracket 70 together.

A combination nozzle and manifold member 75 which contains the hot gas manifold 38 and the set of nozzles 39 may be seen in FIG. 3 although portions of it are visible in FIGS. 1 through 5. In addition to clamping ducting housing 80 to starter housing 69, the clamp ring 81 also clamps the removable member 75 against the housing 69. The purpose of such a structural arrangement is to provide for a quick disassembly of nozzle and manifold member 75 for replacement of its component parts for directing the hot gases toward the turbine blades and for cleaning the exhaust ducting enclosed in the housing 80.

As shown in the drawings, it is desirable to be able to mount the combustion chamber in various positions relative to the started housing 69 in order to mount the unit on various types of turbojet engines. Therefore, mounting bracket arrangements are provided to mount the combustion chamber composed of the base 35 and cover 36 on either the left end of ducting housing 80 as shown in FIGS. 2, 3, 4 and 6, a side position shown in FIGS. 5 and 7, or a bottom position (not shown). A mounting bracket 83 is shown attached to ducting housing 80 in FIGS. 2, 3, 4 and 6. A clamping ring 84 clamps the combustion chamber composed of the base 35 and through bolts 85 and 86. The cover 36 is secured to the base 35 by a breech lock 87.

Figure 5:
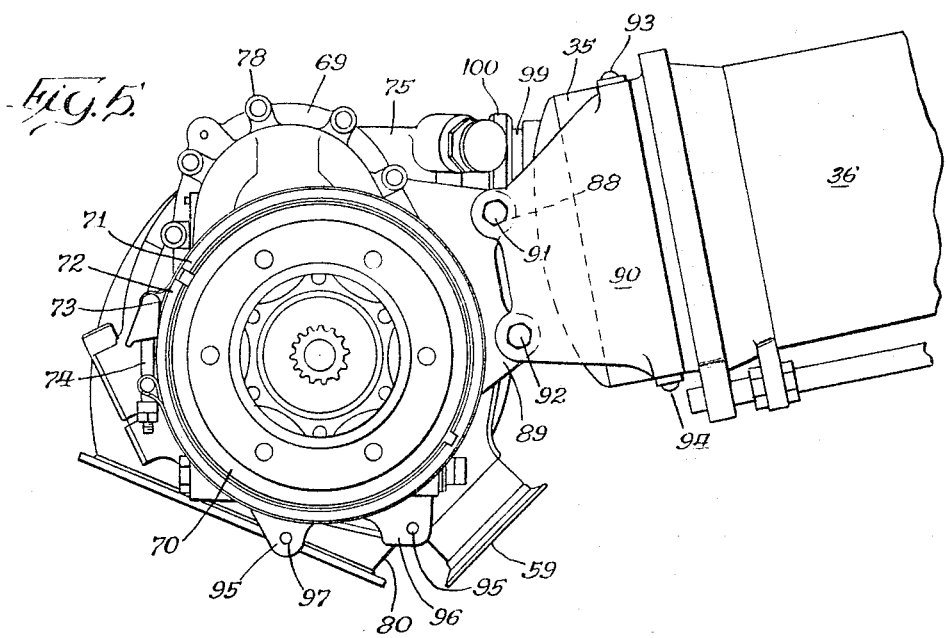
FIG. 5 is an external right-end view of the starter with the combustion chamber mounted on the rear side of the starter housing.
Figure 6:
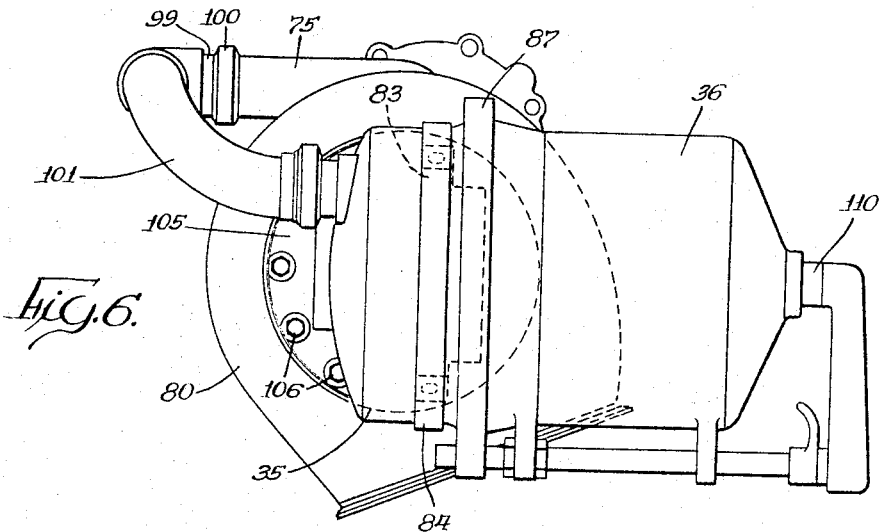
FIG. 6 is an external left-end view of the starter with the combustion chamber mounted on the end of the ducting housing.
Figure 7:
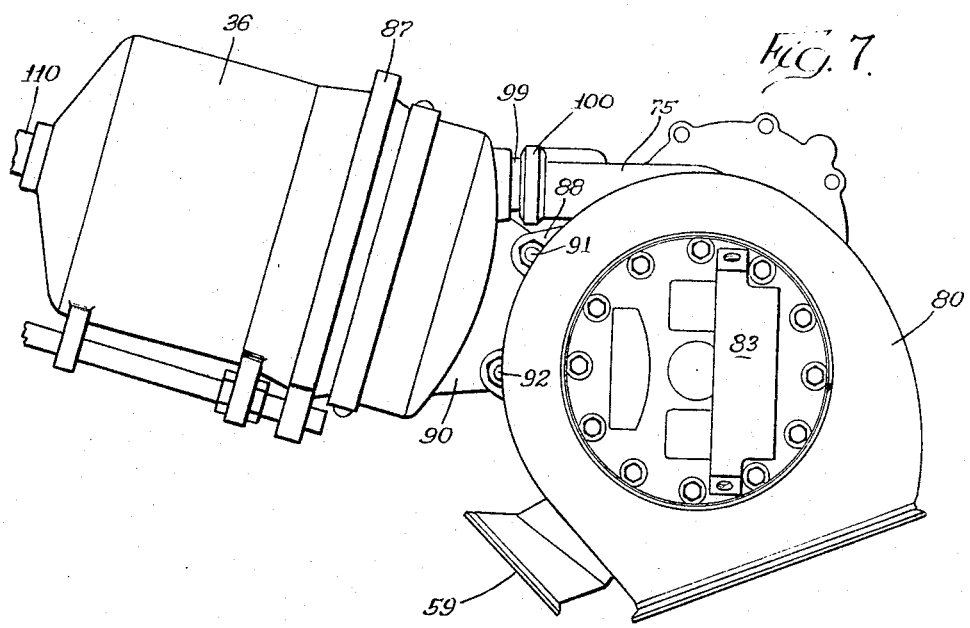
FIG. 7 is an external left-end view of the starter with the combustion chamber mounted on the rear side.

As shown in FIGS. 5 and 7, the mounting of the combustion chamber in the side position is accomplished by use of ear portions 88 and 89 on the housing 69b, to which a bracket 90 is secured by bolts 91 and 92. Bolts 93 and 94 secure the combustion chamber to bracket 90. The third position for mounting the combustion chamber, that is, on the bottom of the starter housing 69, is provided for by ear portions 95 and 96 of housing 69b. The bracket 90 may be secured to the chamber base 35 by bolts 93 and 94 as is done for side mounting of the chamber. Bracket 90 is then secured to the ear portions 95 and 96 by bolts 91 and 92 positioned in bores 97 and 98.

As shown in FIGS. 5 and 7, the side mounting of the chamber makes it possible to connect a chamber outlet passage 99 directly to nozzle and manifold member 75. This connection is secured by a U-shaped clamping ring 100. When the combustion chamber is mounted in the end or bottom positions a gas pipe 101 is utilized to connect the chamber outlet passage 99 to member 75 as shown in FIGS. 2, 3, 4 and 6. For these mounting positions of the combustion chamber, clamping ring 100 is utilized to connect the pipe 101 to member 75 and a U-shaped clamp ring 102 is utilized to connect the pipe to outlet passage 99.

In order to provide access to the fan 34 without removal of the ducting housing 80 from the housing 69, a cover plate 105 (FIG. 6) may be removed from the housing 80 by the removal of a set of bolts 106.

A compressed air inlet passage 59 is shown in FIGS. 4, 5 and 7.

Referring now to FIG. 8, the hot gas pipe 101 is shown in longitudinal section to illustrate the relative location of its component parts. An inner tube 230, constructed of metallic material which is highly resistant to the high temperaures of the gases produced by the combustion of a solid propellant, is rigidly secured to a fitting 231. The other end of tube 230 is slidably supported by a fitting 232 in a recess 233. As the hot gases cause the sleeve 230 to expand both in length and in radius, it will fill up the axial and radial clearances normally existing between it and the wall of recess 233. Tube 230 is surrounded by an insulating layer of material 234. The layer is surrounded by a metallic sleeve 235 capable of resisting the high pressure produced by the gases from the combustion of a solid propellant because this tube is exposed to lower temperatures. The sleeve 235 is rigidly secured and sealed to fitting 231 at one end and to fitting 232 at the other end. A second layer of insulating material 236 surrounds sleeve 235, a portion of fitting 231 and a portion of fitting 232. A final metallic sleeve 237 surrounds the outer layer 236 of insulation and maintains the said insulation in position. The sleeve 237 is rigidly secured at one end of fitting 231 and at the other end to fitting 232. Therefore, each layer of insulation is sealed in place between a pair of metallic sleeves. The hot gases will cause a large amount of expansion in sleeve 230 which is allowed for in the clearances in recess 233. These clearances will allow a certain amount of gas to pass into the inner layer of insulation but they will be prevented from leaking out by the center pressure retaining sleeve 235. The outer layer of insulation provides for further heat protection and sleeve 237 functions to hold this layer of insulation in position.

Fittings 231 and 232 are provided with recesses 238 and 239, respectively. A fitting 241 is secured to the combustion chamber base 35 and a recess 242 is formed in the root of the flange portion of fitting 241. A sealing ring 245 having a trapezoidal cross section as shown in FIG. 9 is placed so that it rests in recesses 238 and 242 with the longest diagonal of the trapezoid extending from the outside corner of recess 238 to the inside corner of 242. As the fitting 231 is forced toward fitting 241 with the sealing ring therebetween, the corners at the ends of the long diagonal of the trapezoidal sealing ring 245 will dig into the respective corners of the recesses completing the sealing action. Fitting 231 is forced toward fitting 241. Fitting 243 has a recess 244 similar to that of recess 242 in fitting 241 which aligns with the recess 239 in fitting 232. Another trapezoidal sealing ring 246 provides a sealing in the same manner as described above between fitting 243 and 232. The U-shaped clamping ring 100 performs the same type of function as clamping ring 102 to hold the fittings together with the ring 246 compressed therebetween.

In order to keep the welds and the seals described as cool as possible it is desirable to have an inner tube such as 247 placed inside fitting 241 which is welded to the combustion chamber base 35. The tube 247 is free to expand under the contact of the hot gases. The heat received is insulated from fitting 241, fitting 231 and the wall of the combustion chamber by the air space 247' and 248.

The inner wall surface of the base 35 of the combustion chamber has a layer of insulation 249 covering it and a layer of metal 250 retaining the insulation layer in place.

A tube 251 is utilized in manifold 38 to reduce the amount of heat reaching the member 75. In this case, the tube is separated by the air space 252 from member 75. In order to improve the sealing ability of the fittings, one fitting is placed to fit inside another. For example, fitting 232 expands into fitting 243 and fitting 241 expands into fitting 231. The axial junction between these fittings also acts as a partial insulation barrier to the transfer of heat outwardly from the hot gas. Thus the design of the hot gas pipe and the various fittings are aimed at reducing the transfer of heat to a minimum.

A wire of the electrical wiring system 37 is carried through a handle structure 110 through the top of cover 36 to make contact with the propellant. Another wire is grounded to base 35. When a solid propellant cartridge is placed in the combustion chamber and the cover clamped to the base by handle structure 110 and breech lock 87, there is a completed ignition circuit between the two electrical leads through an igniter means in the top of the cartridge, a metallic cartridge container, and the base 35. For the purpose of igniting the solid propellant cartridge, a switch means connecting a source of electrical potential to the wires is suitably mounted in the aircraft.

While the structure herein described disclosed a preferred embodiment of the present invention, modifications may be made which are within the true scope of the invention. Therefore, it is intended that the invention is limited only by the prior art and the appended claims:

We claim:

1. In an engine starter, the combination comprising, a turbine housing, a turbine wheel rotatable in said housing, hot gas nozzles in said housing for directing combustion gases to said turbine wheel, manifold means for conveying gases to said nozzles, a cartridge having a fuel combustion chamber for receiving a solid propellant, hot gas piping means for transporting gases at high temperatures from said combustion chamber to said manifold means, first means connecting one end of said piping to said combustion chamber, second means connecting the other end of said piping to said manifold means, said piping means including a heat resistant sleeve having one end mounted in said first connecting means and the other end mounted in said second connecting means, said first connecting means including a connector member fixed to said combustion chamber and a fitting member receiving said piping means, one of said first connecting means members having a reduced portion projecting axially therefrom, the other member having an axial recess receiving said reduced portion and a high temperature resistant tube within said first connecting means and extending into said combustion chamber, said temperature resistant tube having an annular radially extending flange received within said axially extending recess, said axial projection on said one member abutting and clamping said tube flange in said axial recess.

2. In an engine starter, the combination comprising, a turbine housing, a turbine wheel rotatable in said housing, hot gas nozzles in said housing for directing combination gases to said turbine wheel, manifold means for conveying gases to said nozzles, a cartridge having a fuel combustion chamber for receiving a solid propellant, hot gas piping means for transporting gases at high temperatures from said combustion chamber to said manifold means, first means connecting one end of said piping to said combustion chamber, second means connecting the other end of said piping to said manifold means, said second connecting means including a connector member fixed to said manifold means and a fitting member receiving the other end of said piping means, one of said second connecting means members having a reduced portion projecting axially therefrom, the other of said second connecting means members having an axial recess receiving said reduced portion of said one member, a heat resistant tube mounted within said manifold means and having an annular flange at one end thereof received within said recess in said other connecting means member, the axial projection on said one member abutting and clamping said tube flange in said axial recess, said heat resistant tube having a substantial axial portion thereof spaced radially from said manifold means to insulate the manifold means from excessive heat, and an annular clamping member surrounding and engaging said second connecting means members.

3. The combination as defined in claim 1, wherein said second connecting means includes a connector member fixed to said manifold means and a fitting member receiving the other end of said piping means, said first connecting means including a flanged cylindrical portion on each of said first connecting means fitting member and connector member, each of said flanged portions having a front face portion perpendicular to the center line of the piping means and a rear face inclined to said front face so that each of the flanged portions is narrowest at its outer periphery, each of said flanged portions having a recessed portion in said front face opening to the corresponding recessed portion in the adjacent flanged portion and defining therewith a sealing recess, and a trapezoidal sealing ring with a sealing recess.

4. The combination as defined in claim 3, wherein said first connecting means includes an annular clamp surrounding said flanged portions and engaging said inclined faces thereon.

5. The combination as defined in claim 3, wherein each of said second connecting means fitting member and connector member includes a flanged cylindrical portion having a front face portion perpendicular to the center line of the piping means and a rear face inclined to said front face so that the flanged portion is narrowest at its outer periphery, each of said second connecting means flanged portions having a recessed portion in said frontface opening to the corresponding recessed portion in the adjacent flanged portion and defining therewith a second sealing recess, and a second trapezoidal sealing ring in said second sealing recess.

6. The combination as defined in claim 3, wherein the long diagonal of said trapezoidal seal ring intersects the radial innermost portion of the recess in said member having the axial projection thereon.

7. The combination as defined in claim 1, wherein said combustion chamber has a layer of insulation covering the inner side of the combustion chamber wall adjacent the associated connector member, and a metallic sheet covering said layer, said temperature resistant tube extending through said sheet, said layer of insulation, and into said combustion chamber.

8. The combination as defined in claim 1, wherein said temperature resistant tube is formed with an annular space therearound whereby the tube acts to insulate the first connecting means members from excessive heat.

9. The combination defined in claim 1, and further including a recess in one of said connecting means, said heat resistant sleeve having one end slidably mounted in said recess and normally spaced from the end of said recess to permit expansion thereof.

10. The combination as defined in claim 9, wherein said sleeve is an inner high temperature resistant sleeve, a high temperature insulation layer surrounding said inner sleeve, and a high pressure resistant sleeve surrounding said insulation layer and having each end thereof secured and sealed to said first and second connecting means.

11. The combination as defined in claim 10, wherein said high pressure resistant sleeve is a center sleeve, an outer layer of high temperature insulating material surrounding said center sleeve, and an outer sleeve surrounding said layer and having each end secured to said first and second connecting means.

12. The combination as defined in claim 9, wherein said recess in said one connecting means has a diameter larger than the diameter of said sleeve to permit radial expansion of the sleeve caused by the hot combustion gases.

13. The combination of claim 9, wherein said other sleeve end is fixedly connected to said other connecting means.

References Cited by the Examiner
UNITED STATES PATENTS

| | | | |
|---|---|---|---|
| 1,170,547 | 2/1916 | Kennedy | 253—59 |
| 2,154,572 | 4/1939 | Lansing | 60—39.14 |
| 2,468,902 | 5/1949 | Villiger | 138—64 |
| 2,620,627 | 12/1952 | Nardone | 60—39.14 |
| 2,693,380 | 11/1954 | Flanagan | 287—130 |
| 2,773,709 | 12/1956 | Smith | 60—39.32 X |
| 2,806,351 | 9/1957 | Kent et al. | 60—39.14 |
| 2,830,438 | 4/1958 | Smith et al. | 60—39.69 |
| 2,839,894 | 6/1958 | Shutts et al. | 60—39.31 |
| 2,922,050 | 1/1960 | Loughran | 60—39.75 X |
| 2,924,245 | 2/1960 | Wilson | 138—64 |
| 2,934,367 | 4/1960 | Gaubatz | 287—130 |
| 3,016,227 | 1/1962 | Lawrence et al. | 60—39.14 X |
| 3,073,114 | 1/1963 | Wood | 60—39.14 |

JULIUS E. WEST, *Primary Examiner.*